United States Patent
Tsou et al.

(10) Patent No.: US 9,197,054 B2
(45) Date of Patent: Nov. 24, 2015

(54) CIRCUIT FOR CONTROLLING A LATCH MODE OF A PULSE WIDTH MODULATION CIRCUIT AND METHOD THEREOF

(71) Applicant: Leadtrend Technology Corp., Hsin-Chu (TW)

(72) Inventors: Ming-Chang Tsou, Hsin-Chu (TW); Fong-Cheng Yang, Hsin-Chu (TW); Shun-Chin Chou, Hsin-Chu (TW)

(73) Assignee: Leadtrend Technology Corp., Science-Based Industrial Park, Hsin-Chu (TW)

( * ) Notice: Subject to any disclaimer, the term of this patent is extended or adjusted under 35 U.S.C. 154(b) by 295 days.

(21) Appl. No.: 13/956,346

(22) Filed: Jul. 31, 2013

(65) Prior Publication Data

US 2014/0043874 A1 Feb. 13, 2014

(30) Foreign Application Priority Data

Aug. 10, 2012 (TW) .............................. 101128957 A

(51) Int. Cl.
*H02H 3/02* (2006.01)
*H02M 3/335* (2006.01)
*H02M 1/32* (2007.01)

(52) U.S. Cl.
CPC ............ *H02H 3/02* (2013.01); *H02M 3/33507* (2013.01); *H02M 1/32* (2013.01)

(58) Field of Classification Search
CPC ....... H02H 3/02; H02M 3/33507; H02M 1/32
See application file for complete search history.

(56) References Cited

U.S. PATENT DOCUMENTS

2011/0261596 A1* 10/2011 Zong et al. ................. 363/21.13
2012/0293146 A1* 11/2012 Zhao et al. ..................... 323/282

* cited by examiner

*Primary Examiner* — Emily P Pham
(74) *Attorney, Agent, or Firm* — Winston Hsu; Scott Margo

(57) ABSTRACT

A circuit for controlling a latch mode of a pulse width modulation circuit includes a D flip-flop, a voltage generation unit, a comparator, and a logic unit. The D flip-flop generates a switch control signal according to a latch enable signal. The voltage generation unit generates a discharge current, and a voltage divider resistor group included in the voltage generation unit generates a first voltage when the voltage generation unit is turned on according to the switch control signal. A voltage of a predetermined pin of the pulse width modulation circuit is equal to a predetermined voltage when the discharge current is equal to the charge current. The comparator compares a reference voltage with the first voltage to generate a comparison signal. The logic unit generates a clear signal according to the comparison signal. The D flip-flop clears the switch control signal according to the clear signal.

20 Claims, 6 Drawing Sheets

CIRCUIT FOR CONTROLLING A LATCH MODE OF A PULSE WIDTH MODULATION CIRCUIT AND METHOD THEREOF

BACKGROUND OF THE INVENTION

1. Field of the Invention

The present invention relates to a circuit for controlling a latch mode of a pulse width modulation circuit and a method thereof, and particular to a circuit for controlling a latch mode of a pulse width modulation circuit and a method thereof that not only can provide an unlatched voltage which is accurate and is not easily influenced by an external environment of the pulse width modulation circuit, but can also let a user calculate time for the unlatched voltage.

2. Description of the Prior Art

Generally speaking, a pulse width modulation circuit utilizes latch mode protection to prevent an alternating current/direct current converter to which the pulse width modulation circuit is applied from being burned down in an abnormal condition, where the latch mode protection can be over voltage protection, over current protection, over load protection, over temperature protection, and so on. In addition, the prior art utilizes turning-off of an alternating input voltage of the alternating current/direct current converter to let a voltage of a predetermined pin of the pulse width modulation circuit be decreased to a predetermined voltage level, resulting in the latch mode protection of the pulse width modulation circuit being removed.

In the prior art, a stabilizing diode coupled to the predetermined pin of the pulse width modulation circuit is used for setting a voltage level of the predetermined pin of the pulse width modulation circuit after the latch mode protection is removed. However, the prior art has disadvantages as follows: first, the stabilizing diode can increase a chip area of the pulse width modulation circuit; second, the voltage level of the predetermined pin of the pulse width modulation circuit after the latch mode protection is removed is easily influenced by an external environmental temperature of the pulse width modulation circuit; and third, the stabilizing diode usually has a ±5% error.

SUMMARY OF THE INVENTION

An embodiment provides a circuit for controlling a latch mode of a pulse width modulation circuit. The circuit includes a D flip-flop, a voltage generation unit, a comparator, and a logic unit. The D flip-flop is used for generating a switch control signal according to a latch enable signal. The voltage generation unit includes a voltage divider resistor group, where the voltage generation unit generates a discharge current, and the voltage divider resistor group generates a first voltage according to the discharge current and a charge current generated by a primary side of an alternating current/direct current converter which the pulse width modulation circuit is applied to when the voltage generation unit is turned on according to the switch control signal, where a voltage of a predetermined pin of the pulse width modulation circuit is equal to a predetermined voltage when the discharge current is equal to the charge current. The comparator is used for comparing a reference voltage with the first voltage to generate a comparison signal. The logic unit is used for generating a clear signal according to the comparison signal. The D flip-flop is further used for clearing the switch control signal according to the clear signal.

Another embodiment provides a method for controlling a latch mode of a pulse width modulation circuit. A circuit for controlling the latch mode of the pulse width modulation circuit includes a D flip-flop, a voltage generation unit, a comparator, and a logic unit, where the voltage generation unit includes a voltage divider resistor group. The method includes the D flip-flop generating a switch control signal according to a latch enable signal; the voltage generation unit generating a discharge current, and the voltage divider resistor group generating a first voltage according to the discharge current and a charge current generated by a primary side of an alternating current/direct current converter which the pulse width modulation circuit is applied to when the voltage generation unit is turned on according to the switch control signal, where a voltage of a predetermined pin of the pulse width modulation circuit is equal to a predetermined voltage when the discharge current is equal to the charge current; the comparator comparing a reference voltage with the first voltage to generate a comparison signal; the logic unit generating a clear signal according to the comparison signal; and the D flip-flop clearing the switch control signal according to the clear signal.

The present invention provides a circuit for controlling a latch mode of a pulse width modulation circuit and a method thereof. The circuit and the method utilize a D flip-flop to generate a switch control signal according to a latch enable signal. Then, a voltage generation unit is turned on according to the switch control signal, and generates a discharge current, where when the discharge current is equal to a charge current generated by a primary side of an alternating current/direct current converter, a voltage of a predetermined pin of the pulse width modulation circuit is equal to a predetermined voltage. Therefore, a user can adjust the predetermined voltage by controlling the charge current, and the user can know time for the voltage of the predetermined pin being decreased from the predetermined voltage to an unlatched voltage by a capacitor coupled to the predetermined pin. Thus, compared to the prior art, the present invention not only can provide the unlatched voltage which is accurate and is not easily influenced by an external environment of the pulse width modulation circuit, but can also let the user control the time for the voltage of the predetermined pin being decreased from the predetermined voltage to the unlatched voltage by adjusting the capacitor coupled to the predetermined pin.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
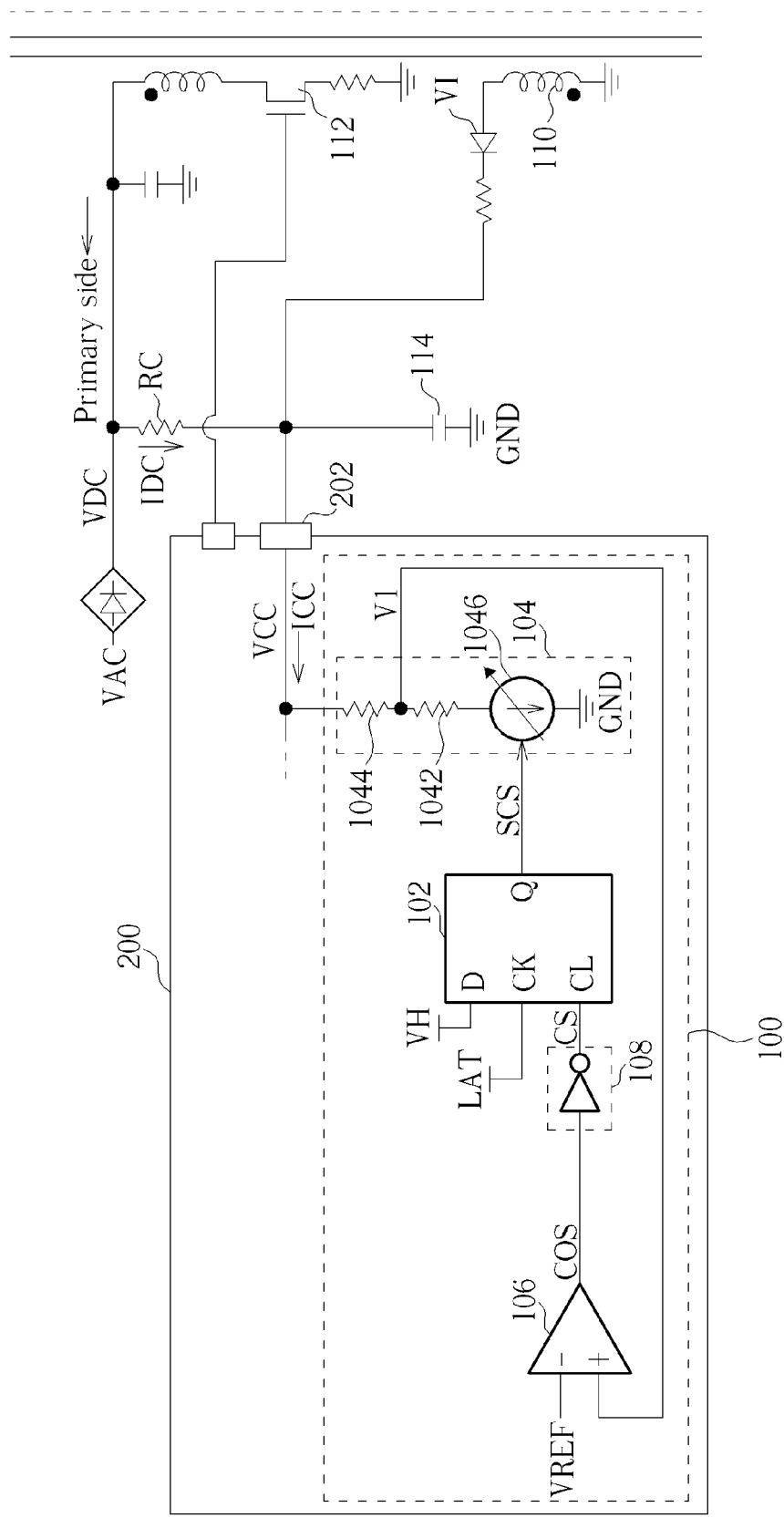
FIG. 1 is a diagram illustrating a circuit for controlling a latch mode of a pulse width modulation circuit according to an embodiment.
Figure 2:
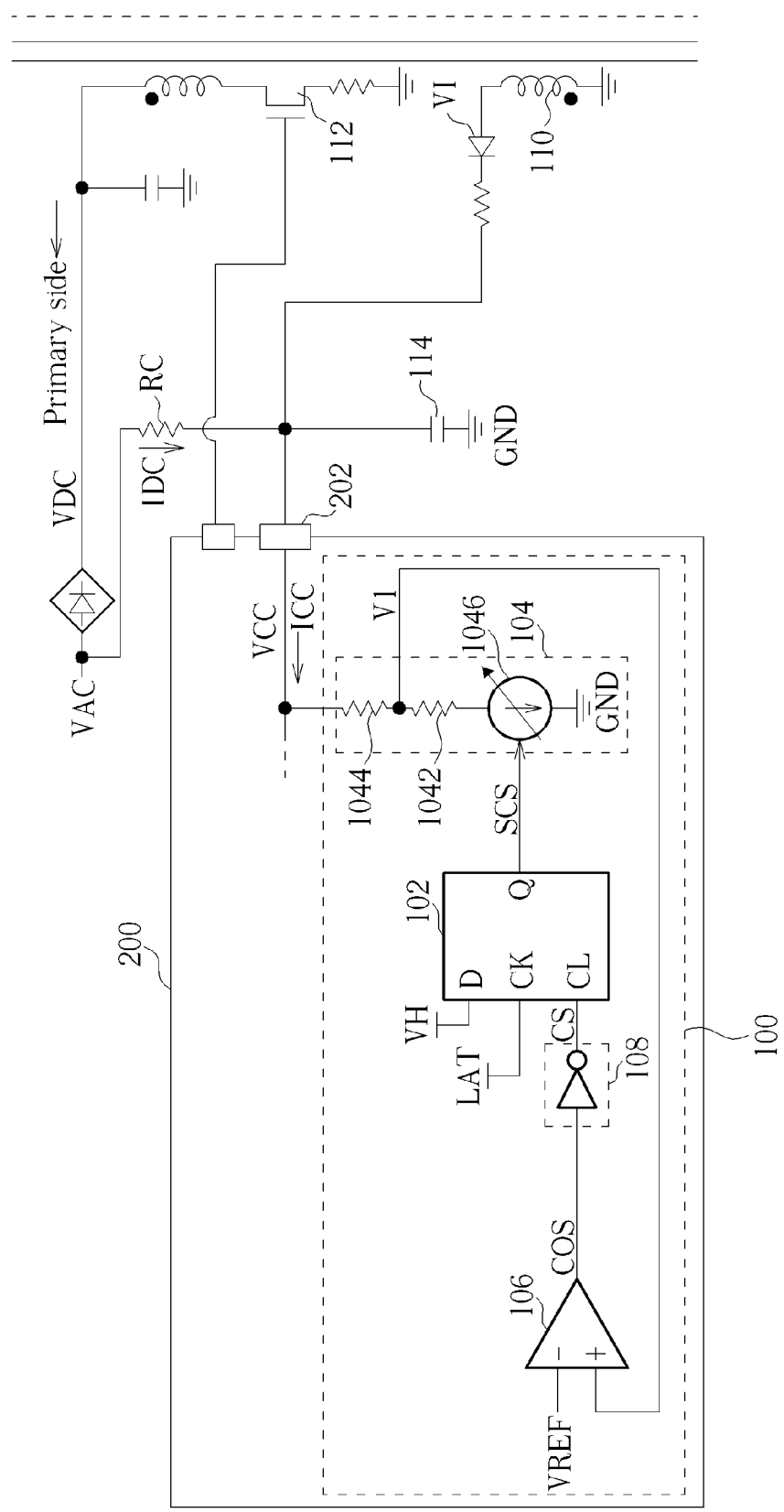
FIG. 2 is a diagram illustrating a circuit 100 for controlling a latch mode of a pulse width modulation circuit according to another embodiment.
Figure 3:
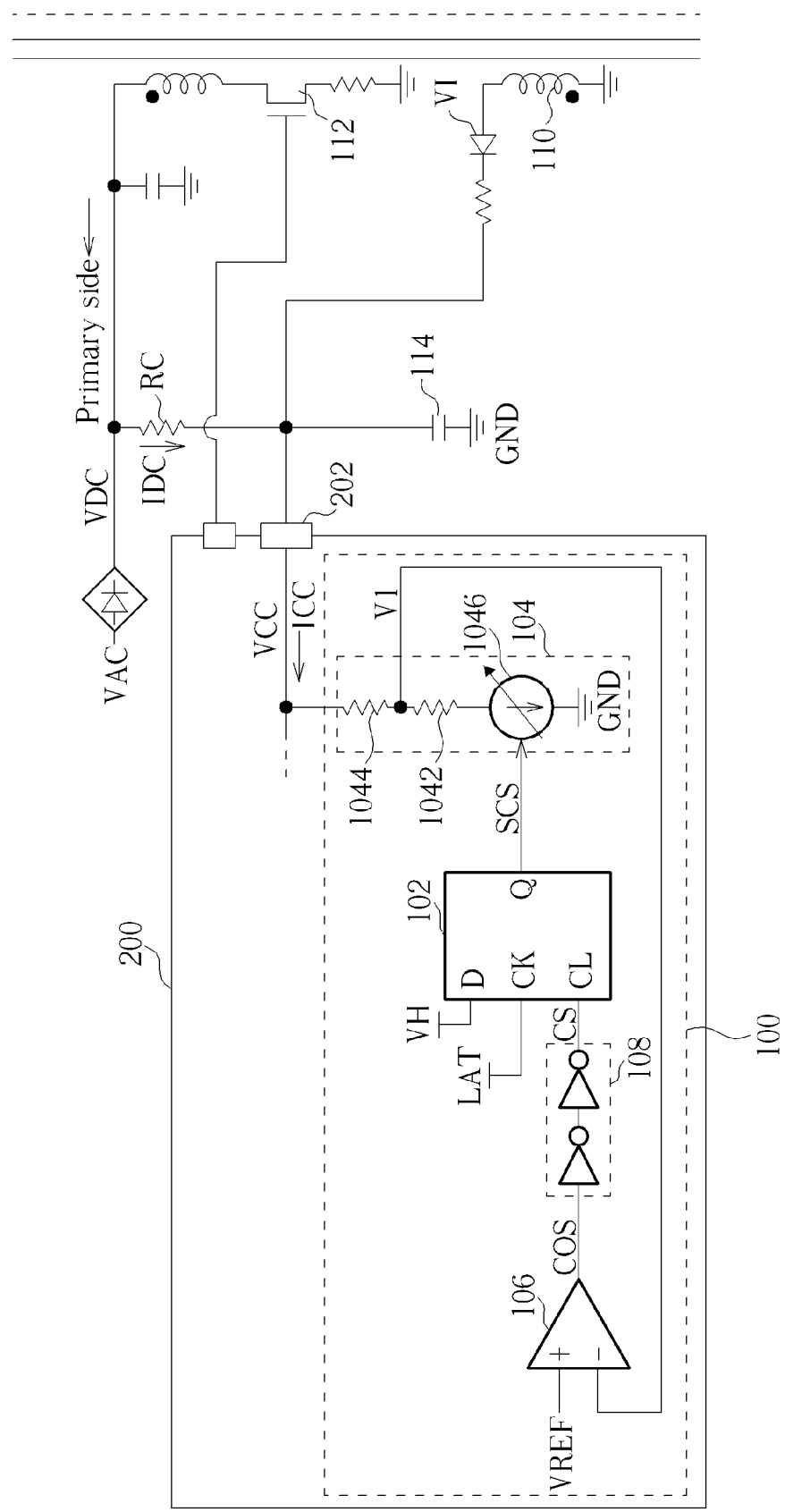
FIG. 3 is a diagram illustrating a circuit 100 for controlling a latch mode of a pulse width modulation circuit according to another embodiment.
Figure 4:
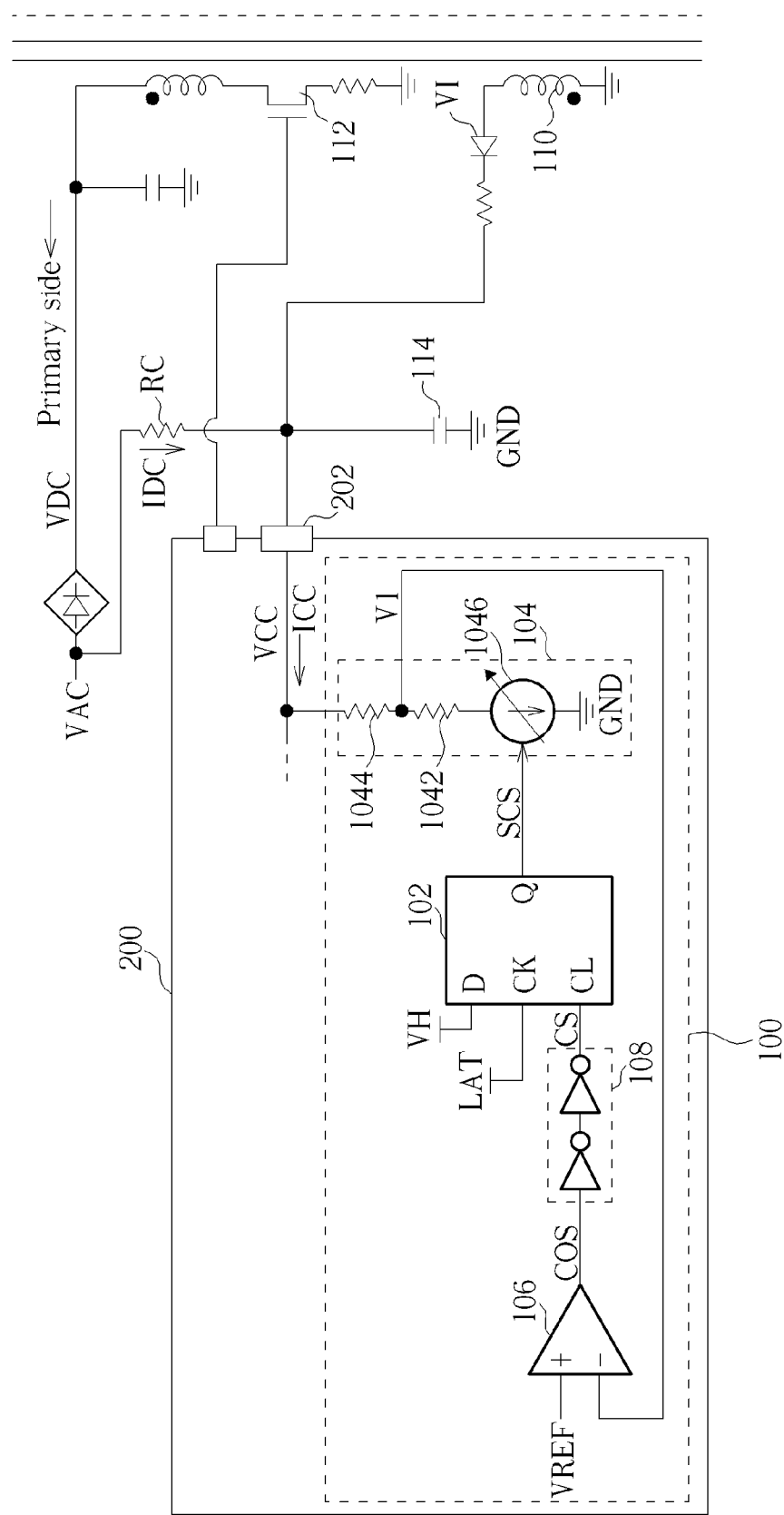
FIG. 4 is a diagram illustrating a circuit 100 for controlling a latch mode of a pulse width modulation circuit according to another embodiment.

Please refer to FIG. 1. FIG. 1 is a diagram illustrating a circuit 100 for controlling a latch mode of a pulse width modulation circuit according to an embodiment. The circuit 100 includes a D flip-flop 102, a voltage generation unit 104, a comparator 106, and a logic unit 108. The D flip-flop 102 is used for generating a switch control signal SCS according to a latch enable signal LAT, where an input terminal D of the D flip-flop 102 is used for receiving a high voltage VH, an input terminal CK of the D flip-flop 102 is used for receiving the latch enable signal LAT, an input terminal CL of the D flip-flop 102 is used for receiving a clear signal CS, and an output terminal Q of the D flip-flop 102 is used for outputting the switch control signal SCS. The voltage generation unit 104 includes a voltage divider resistor group (voltage divider resistors 1042 and 1044), where when a current source 1046 included in the voltage generation unit 104 is turned on according to the switch control signal SCS, the current source 1046 generates a discharge current ICC according to a voltage VCC of a predetermined pin 202 of the pulse width modulation circuit 200 (that is, the discharge current ICC is varied with the voltage VCC of the predetermined pin 202), and the voltage divider resistors 1042 and 1044 generate a first voltage V1 according to the discharge current ICC and a charge current IDC generated by a primary side of an alternating current/direct current converter which the pulse width modulation circuit 200 is applied to, where when the discharge current ICC is equal to the charge current IDC, the voltage VCC of the predetermined pin 202 is equal to a predetermined voltage VP. In addition, as shown in FIG. 1, the charge current IDC is determined by a direct current voltage VDC of the primary side of the alternating current/direct current converter and a charging resistor RC of the primary side. In addition, in another embodiment of the present invention, the charge current IDC is determined by an alternating current voltage VAC of the primary side of the alternating current/direct current converter and the charging resistor RC (as shown in FIG. 2). The logic unit 108 is used for generating the clear signal CS according to a comparison signal COS. The D flip-flop 102 is further used for clearing the switch control signal SCS according to the clear signal CS. As shown in FIG. 1, the comparator 106 is used for comparing a reference voltage VREF with the first voltage V1 to generate the comparison signal COS, where when the reference voltage VREF is greater than the first voltage V1, the comparator 106 generates the comparison signal COS, and the logic unit 108 is an inverter. In another embodiment of the present invention (as shown in FIG. 3), the comparator 106 generates the comparison signal COS when the reference voltage VREF is smaller than the first voltage V1, and the logic unit 108 is composed of two series connected inverters. In addition, in another embodiment of the present invention (as shown in FIG. 4), the comparator 106 generates the comparison signal COS when the reference voltage VREF is smaller than the first voltage V1, and the charge current IDC is determined by the alternating current voltage VAC of the primary side of the alternating current/direct current converter and the charging resistor RC.

Figure 5:
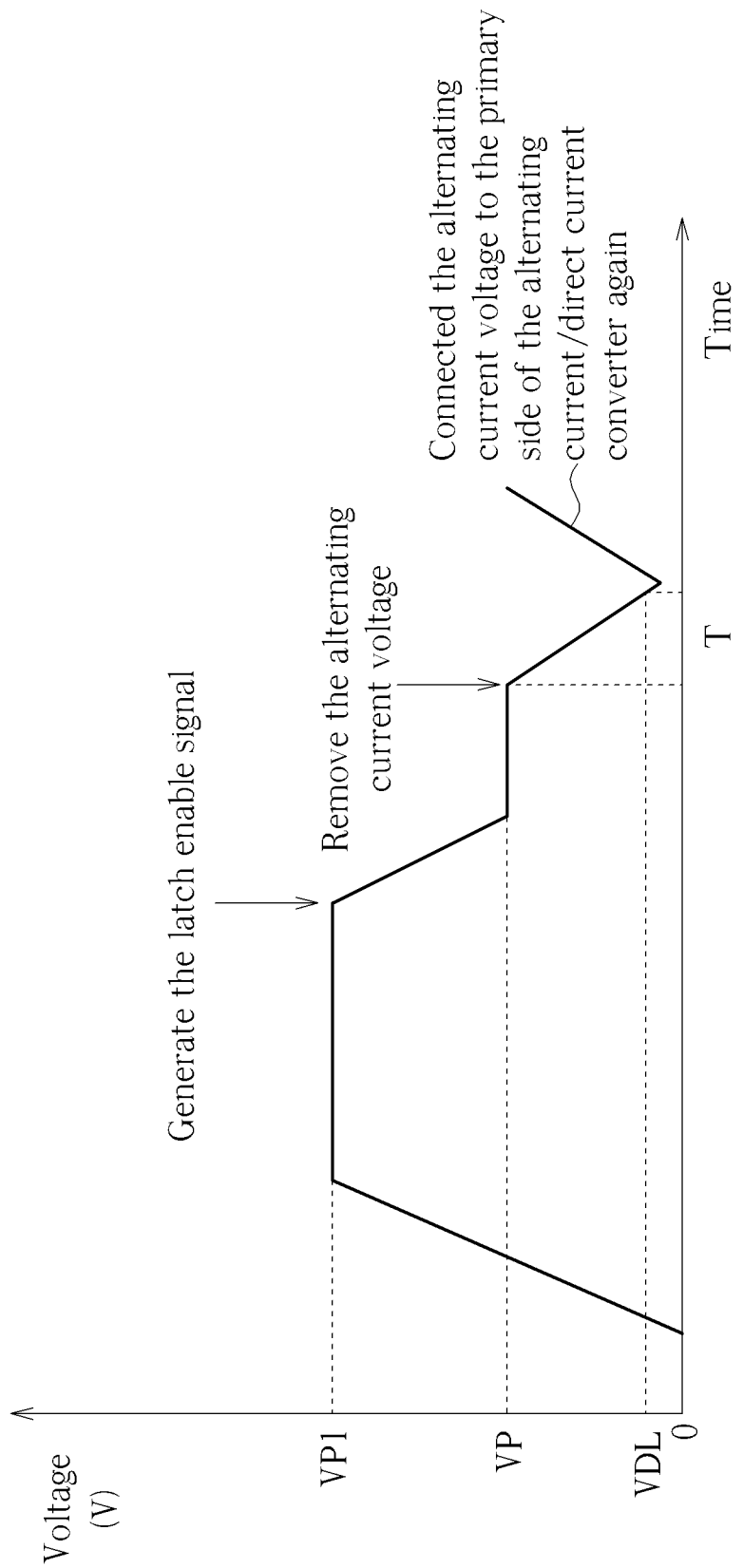
FIG. 5 is a diagram illustrating variation of the voltage of the predetermined pin.

Please refer to FIG. 5. FIG. 5 is a diagram illustrating variation of the voltage VCC of the predetermined pin 202. As shown in FIG. 5, an induced voltage VI of an auxiliary winding 110 of the primary side of the alternating current/direct current converter is gradually increased when the alternating current/direct current converter receives and filters the alternating current voltage VAC into the direct current voltage VDC, so the voltage VCC of the predetermined pin 202 starts to gradually increase from 0V. Meanwhile, the current source 1046 is not turned on yet, and the discharge current ICC (e.g. a 15 uA leakage current) flowing through the predetermined pin 202 is smaller than the charge current IDC (e.g. 220 uA), so the voltage VCC of the predetermined pin 202 can be continuously increased to a first predetermined voltage VP1 (e.g. 15V). When the voltage VCC of the predetermined pin 202 is equal to the first predetermined voltage VP1, the pulse width modulation circuit 200 starts to generate pulse width modulation signals, and a switch 112 of the primary side of the alternating current/direct current converter starts to be turned on and turned off according to the pulse width modulation signals. When the switch 112 starts to be turned on and turned off according to the pulse width modulation signals (meanwhile, the current source 1046 is still turned off), the discharge current ICC (e.g. 2 mA) flowing through the predetermined pin 202 is provided to other circuits within the pulse width modulation circuit 200.

As shown in FIG. 1 and FIG. 5, when the pulse width modulation circuit 200 generates the latch enable signal LAT due to over voltage protection, over current protection, over load protection, over temperature protection, and so on, the D flip-flop 102 generates the switch control signal SCS to the current source 1046 according to the latch enable signal LAT, and the pulse width modulation circuit 200 stops transmitting the pulse width modulation signals to the switch 112 according to the latch enable signal LAT. Meanwhile, because the current source 1046 is turned on according to the switch control signal SCS, the first voltage V1 is a partial voltage of the voltage VCC of the predetermined pin 202. Because the pulse width modulation circuit 200 stops transmitting the pulse width modulation signals to the switch 112, the voltage VCC of the predetermined pin 202 starts to be decreased and the discharge current ICC flowing through the predetermined pin 202 starts to be also decreased.

As shown in FIG. 5, when the voltage VCC of the predetermined pin 202 is continuously decreased to the predetermined voltage VP, the discharge current ICC flowing through the predetermined pin 202 is equal to the charge current IDC. Thus, the voltage VCC of the predetermined pin 202 can be maintained at the predetermined voltage VP. That is to say, a user can adjust the predetermined voltage VP by controlling the charge current IDC. However, when the alternating current voltage VAC is removed, the charge current IDC is decreased to zero. Meanwhile, the voltage VCC of the predetermined pin 202 starts to be decreased to an unlatched voltage VDL according to the discharge current ICC flowing through the predetermined pin 202, where time T for the voltage VCC of the predetermined pin 202 being decreased from the predetermined voltage VP to the unlatched voltage VDL is determined according to equation (1):

$$T=(VP-VDL)/C \qquad (1)$$

As shown in equation (1), C is a capacitance of a capacitor 114 coupled to the predetermined pin 202. Therefore, the user can know that how long the alternating current voltage VAC can be connected to the primary side of the alternating current/direct current converter again after the alternating current voltage VAC is removed.

As shown in FIG. 1 and FIG. 5, when the voltage VCC of the predetermined pin 202 is lower than the unlatched voltage VDL, because the reference voltage VREF is greater than first voltage V1, the comparator 106 generates the comparison signal COS, resulting in the logic unit 108 generating the clear signal CS according to the comparison signal COS. Therefore, the D flip-flop 102 can clear the switch control signal SCS according to the clear signal CS, resulting in the voltage generation unit 104 being turned off, and the first voltage V1 is increased to a high voltage. In addition, in another embodiment of the present invention, when the voltage generation unit 104 is turned on according to the switch control signal SCS, the voltage generation unit 104 utilizes a fixed current source to generate the discharge current ICC, where subsequent operational principles thereof can be referred to FIG. 1 and FIG. 5, so further description thereof is omitted for simplicity.

Figure 6:
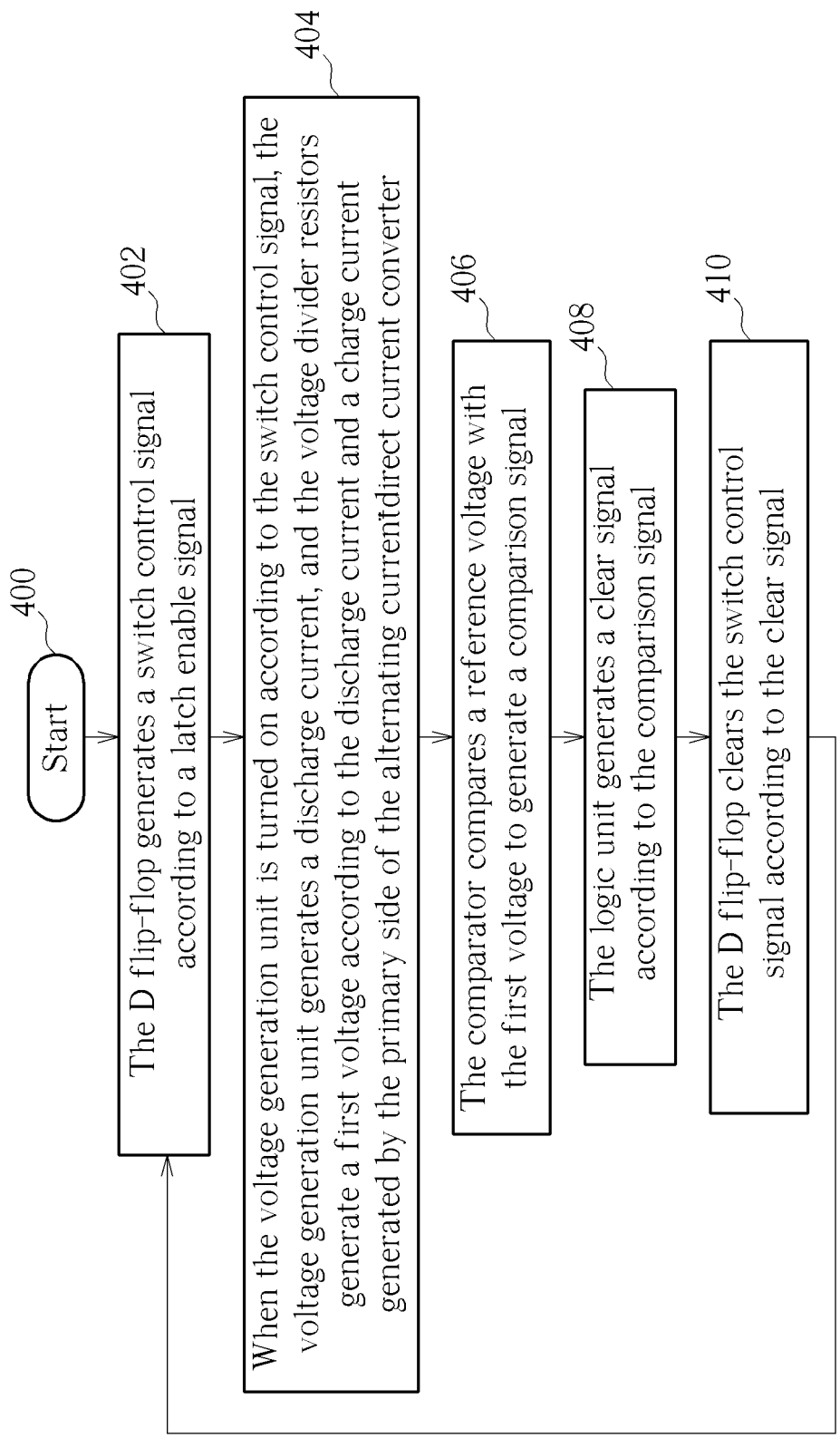
FIG. 6 is a flowchart illustrating a method for controlling a latch mode of a pulse width modulation circuit according to another embodiment.

Please refer to FIG. 6, FIG. 1, FIG. 2, FIG. 3, FIG. 4, and FIG. 5. FIG. 6 is a flowchart illustrating a method for controlling a latch mode of a pulse width modulation circuit according to another embodiment. The method in FIG. 6 is illustrated using the circuit 100 in FIG. 1. Detailed steps are as follows:

Step 400: Start.

Step 402: The D flip-flop 102 generates a switch control signal SCS according to a latch enable signal LAT.

Step 404: When the voltage generation unit 104 is turned on according to the switch control signal SCS, the voltage generation unit 104 generates a discharge current ICC, and the voltage divider resistors 1042 and 1044 generate a first voltage V1 according to the discharge current ICC and a charge current IDC generated by the primary side of the alternating current/direct current converter.

Step 406: The comparator 106 compares a reference voltage VREF with the first voltage V1 to generate a comparison signal COS.

Step 408: The logic unit 108 generates a clear signal CS according to the comparison signal COS.

Step 410: The D flip-flop 102 clears the switch control signal SCS according to the clear signal CS; go to Step 402.

In Step 402, the pulse width modulation circuit 200 can generate the latch enable signal LAT to the D flip-flop 102 due to the over voltage protection, the over current protection, the over load protection, the over temperature protection, and so on. Therefore, the D flip-flop 102 can generates the switch control signal SCS to the voltage generation unit 104 according to the latch enable signal LAT. In Step 404, the current source 1046 included in the voltage generation unit 104 generates the discharge current ICC according to a voltage VCC of the predetermined pin 202 of the pulse width modulation circuit 200 (that is, the discharge current ICC is varied with the voltage VCC of the predetermined pin 202), and the voltage divider resistors 1042 and 1044 generate the first voltage V1 to the comparator 106 according to the discharge current ICC and the charge current IDC, where the charge current IDC is determined by a direct current voltage VDC of the primary side of the alternating current/direct current converter and the charging resistor RC, the voltage VCC corresponds to an induced voltage VI generated by the auxiliary winding 110, and the first voltage V1 is a partial voltage of the voltage VCC of the predetermined pin 202. As shown in FIG. 5, when the voltage VCC of the predetermined pin 202 is continuously decreased to the predetermined voltage VP, the discharge current ICC flowing through the predetermined pin 202 is equal to the charge current IDC. Thus, the voltage VCC of the predetermined pin 202 can be maintained at the predetermined voltage VP. In Step 406, when the reference voltage VREF is smaller than the first voltage V1, the comparator 106 does not generate the comparison signal COS. However, as shown in FIG. 5, when the alternating current voltage VAC is removed, the charge current IDC is decreased to zero, resulting in the comparator 106 generating the comparison signal COS when the first voltage V1 is decreased with the voltage VCC of the predetermined pin 202 to be lower than the reference voltage VREF (that is, the voltage VCC is lower than the unlatched voltage VDL). But, in another embodiment of the present invention (as shown in FIG. 3 and FIG. 4), the comparator 106 generates the comparison signal COS when the reference voltage VREF is smaller than the first voltage V1. In Step 408, the logic unit 108 (e.g. the inverter as shown in FIG. 1) can generate the clear signal CS according to the comparison signal COS. In Step 410, the D flip-flop 102 clears the switch control signal SCS according to the clear signal CS, resulting in the voltage generation unit 104 being turned off, and the first voltage V1 is increased to a high voltage again. Thus, the D flip-flop 102 can wait for the latch enable signal LAT generated by the pulse width modulation circuit 200 due to the over voltage protection, the over current protection, the over load protection, the over temperature protection, and so on again.

To sum up, the circuit for controlling the latch mode of the pulse width modulation circuit and the method thereof utilize the D flip-flop to generate a switch control signal according to a latch enable signal. Then, the voltage generation unit is turned on according to the switch control signal, and generates a discharge current, where when the discharge current is equal to a charge current generated by the primary side of the alternating current/direct current converter, a voltage of the predetermined pin of the pulse width modulation circuit is equal to the predetermined voltage. Therefore, the user can adjust the predetermined voltage by controlling the charge current, and the user can know time for the voltage of the predetermined pin being decreased from the predetermined voltage to the unlatched voltage by the capacitor coupled to the predetermined pin. Thus, compared to the prior art, the present invention not only can provide the unlatched voltage which is accurate and is not easily influenced by an external environment of the pulse width modulation circuit, but can also let the user control the time for the voltage of the predetermined pin being decreased from the predetermined voltage to the unlatched voltage by adjusting the capacitor coupled to the predetermined pin.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for controlling a latch mode of a pulse width modulation circuit, the circuit comprising:
   a D flip-flop for generating a switch control signal according to a latch enable signal;
   a voltage generation unit comprising a voltage divider resistor group, wherein the voltage generation unit generates a discharge current, and the voltage divider resistor group generates a first voltage according to the discharge current and a charge current generated by a primary side of an alternating current/direct current converter which the pulse width modulation circuit is applied to when the voltage generation unit is turned on according to the switch control signal, wherein a voltage of a predetermined pin of the pulse width modulation circuit is equal to a predetermined voltage when the discharge current is equal to the charge current;
   a comparator for comparing a reference voltage with the first voltage to generate a comparison signal; and
   a logic unit for generating a clear signal according to the comparison signal;

wherein the D flip-flop clears the switch control signal according to the clear signal.

2. The circuit of claim 1, wherein the comparator generates the comparison signal when the reference voltage is greater than the first voltage.

3. The circuit of claim 2, wherein the logic unit is an inverter.

4. The circuit of claim 1, wherein the comparator generates the comparison signal when the reference voltage is smaller than the first voltage.

5. The circuit of claim 4, wherein the logic unit is composed of two series connected inverters.

6. The circuit of claim 1, wherein the first voltage is a partial voltage of the voltage of the predetermined pin.

7. The circuit of claim 1, wherein the charge current is determined by a direct current voltage and a charging resistor of the primary side.

8. The circuit of claim 1, wherein the voltage of the predetermined pin corresponds to a voltage generated by an auxiliary winding of the primary side.

9. The circuit of claim 1, wherein the voltage generation unit generates the discharge current according to the voltage of the predetermined pin.

10. The circuit of claim 1, wherein the voltage generation unit utilizes a fixed current source to generate the discharge current.

11. A method for controlling a latch mode of a pulse width modulation circuit, a circuit for controlling the latch mode of the pulse width modulation circuit comprising a D flip-flop, a voltage generation unit, a comparator, and a logic unit, wherein the voltage generation unit comprises a voltage divider resistor group, the method comprising:

the D flip-flop generating a switch control signal according to a latch enable signal;

the voltage generation unit generating a discharge current, and the voltage divider resistor group generating a first voltage according to the discharge current and a charge current generated by a primary side of an alternating current/direct current converter which the pulse width modulation circuit is applied to when the voltage generation unit is turned on according to the switch control signal, wherein a voltage of a predetermined pin of the pulse width modulation circuit is equal to a predetermined voltage when the discharge current is equal to the charge current;

the comparator comparing a reference voltage with the first voltage to generate a comparison signal;

the logic unit generating a clear signal according to the comparison signal; and the D flip-flop clearing the switch control signal according to the clear signal.

12. The method of claim 11, wherein the comparator generates the comparison signal when the reference voltage is greater than the first voltage.

13. The method of claim 12, wherein the logic unit is an inverter.

14. The method of claim 11, wherein the comparator generates the comparison signal when the reference voltage is smaller than the first voltage.

15. The method of claim 14, wherein the logic unit is composed of two series connected inverters.

16. The method of claim 11, wherein the first voltage is a partial voltage of the voltage of the predetermined pin.

17. The method of claim 11, wherein the charge current is determined by a direct current voltage and a charging resistor of the primary side.

18. The method of claim 11, wherein the voltage of the predetermined pin corresponds to a voltage generated by an auxiliary winding of the primary side.

19. The method of claim 11, wherein the voltage generation unit generates the discharge current according to the voltage of the predetermined pin.

20. The method of claim 11, wherein the voltage generation unit utilizes a fixed current source to generate the discharge current.

* * * * *